United States Patent Office 3,677,783
Patented July 18, 1972

3,677,783
CALCINED MOLYBDATED ZINC OXIDE PIGMENTS AND METHOD OF PREPARATION THEREOF
Truman Kirkpatrick, Lombard, and James Jacob Nilles, Oak Forest, Ill., assignors to The Sherwin-Williams Company, Cleveland, Ohio
Filed Sept. 18, 1969, Ser. No. 859,106
Int. Cl. C09c 1/04
U.S. Cl. 106—292                                    7 Claims

ABSTRACT OF THE DISCLOSURE

This invention provides a method for the manufacture of a novel composition of matter corresponding to $$2ZnO:MoO_3$$

and corrosion inhibiting pigmentary particles containing the same by reaction in aqueous slurry of pigmentary zinc oxide and molybdenum trioxide with calcination following particle recovery at elevated but less than sintering temperatures (preferably at about 600° C.).

---

This invention relates to a novel series of corrosion inhibiting molybdated zinc oxide pigments and in particular, to a method for the manufacture of the same.

More particularly, this invention relates to novel heat-treated molybdated zinc oxide pigments containing as a new composition of matter a compound having the general formula $2ZnO:MoO_3$ which in pigment form has corrosion inhibiting properties in paint systems as an outstanding utility.

Heretofore a number of pigments have been known to impart corrosion and rust inhibiting properties to varnish and oil vehicles in which they were suspended or ground to form paints and enamels. Most known corrosion resisting pigmented coatings possess color and most pigments, known to impart corrosion inhibition to coatings, are sufficiently toxic to prevent end use in contact with food-stuffs. Notable among prior art coatings are those containing lead and chromate ions and certain iron oxides. The prior art suggests calcium and zinc molybdates to have corrosion inhibiting properties and to be of value in reduced toxicity to living organisms.

Pigments of this general class have been made by double decomposition reactions between water soluble zinc salts (chloride and sulfate) and sodium molybdate. Unfortunately, water soluble by-product salts are in practice extremely difficult to remove from the reaction products and small quantities of retained salts as impurities therein decrease durability of the resultant pigments disproportionately. Additionally, such salts contribute to emulsion instability when the pigments are employed in emulsion paint systems. Also objectionable is the fact that pigments so produced have widely divergent particle sizes varying from about 3 to 30 microns in particle diameter.

Recent U.S. Pat. 3,353,979 discloses a hydrated molybdated zinc oxide pigment which overcomes the salt problem, particle size frequency problems and produces superior corrosion inhibiting properties when formulated as part of a paint system.

The present invention utilizes all of the advantages of the above patent process but advances the art by producing zinc molybdate pigments of novel crystal structure by the addition of a heat treating or calcining step. A more basic zinc molybdate is thus produced.

While one might be led to believe that a "basic" zinc molybdate might be more effective than a "neutral" zinc molybdate, Kirk & Othmer's Encylopedia of Chemical Technology, vol. 9, p. 205 states that "basic" molybdates are very rare and that basic lead molybdate $PbO.PbMO_4$ is the only compound in this class that is well authenticated.

X-ray diffraction studies, emission analysis, infra-red absorption studies and practical salt spray evaluation indicate a useful series of novel corrosion inhibiting pigments can be produced ranging from in excess of 1:1 to about 10:1 molar ratio of ZnO to $MoO_3$ by the method. The composition studies indicate a new crystal form is produced in relatively pure form at about 2:1 molar ratio (or very slightly in excess thereof). The composition can be recognized as forming in X-ray diffraction patterns at a 1.5:1 ratio.

In its most novel aspects this invention comprises a new composition of matter having the general formula $$yZnO \cdot xMoO_3$$

where $y$ is greater than $x$ (best evidence indicates $y=2x$) but not greater than $10x$.

In the composition of this invention the zinc oxide component exceeds the molybdenum trioxide component stoichiometrically and marked differences have been noted between the 1:1 ratio and the 2:1 ratio of ZnO to $MoO_3$ where the new compound has been established by the combination of X-ray diffraction studies, infrared absorption curves, emission analysis and active test results obtained by studies of these pigments when formulated into corrosion inhibiting test paints and exposed to accelerated corrosion tests standardly used in such paint corrosion studies. In the preferred form of the invention the zinc oxide component exceeds the molybdenum trioxide. A definite new composition of matter in evidence at a 2:1 ratio (observed to form at 1.5:1 ratio) and from the 2:1 ratio to about a 10:1 ratio the novel composition formed at the 2:1 level can be identified in the reaction products of the series although free ZnO is obviously present. The temperature of heating is not critical being from temperatures above 120° C., preferably above 300° C. and a commercially desirable level of about 600° C. is quite suitable. For pigment end use below the sintering temperature produces the most useful pigments.

The present invention is reduced to practice as follows:

A fluent aqueous slurry of solid molybdenum trioxide is made. A saturated solution at 70° C. contains approximately 2% $MoO_3$ by weight but useful concentrations far exceed those indicated by solubility limit. Undissolved $MoO_3$ in the slurry appears to react readily. Concentration of $MoO_3$ in the aqueous slurry is not critical. Water provides a carrier for the reactants. The concentrations should be sufficiently dilute to be easily agitated or stirred, but not so concentrated as to be a paste. Overly dilute slurries require unnecessarily large processing vessels. A satisfactory level is four parts by weight of $MoO_3$ per 100 weight parts of water. The concentration is not critical, however.

In another container one produces a slurry of pigmentary zinc oxide of commerce (Ozide 20). Zinc oxide pigment is usually produced by a fuming process and is of extremely fine particle size, e.g., less than one micron. Coarser grades including those up to an average particle diameter of the order of 3 microns can be used, but are not preferred. About 20% by weight of the pigment dispersed in water provides a convenient fluent slurry. If an acicular grade of zinc oxide pigment is selected, a more dilute concentration of pigment is advantageous. Temperature of reaction is also not critical and advantageously is carried out from about 20° C. to the boiling point or about 110° C. Temperatures intermediate room and the boiling point have produced excellent products.

The two slurries are admixed, one with the other, with good agitation in a third container, or one may be added to the other. After a brief period of agitation, the admixture becomes more viscous, taking on the appearance of cottage cheese. It is the viscosity at this point which fundamentally directs the amount of water preferably present. It is undesirable to have the "cheese" stage be so heavy as to materially interfere with rapid agitation at this point. Agitation is continued until a minimum level of molybdenum is found in the filtrate. Below a 2:1 level of zinc to molybdenum a blue color of the filtrate generally persists. In more quantitative determinations, lead molybdate is determined by gravimetric analysis as a means for quality control in processing.

Other sources of molybdate ion than the $MoO_3$ have been employed, but inherently introduce salt removal problems which are extremely difficult to overcome. When the filtrate shows substantial absence of molybdenum as described, the water insoluble material is filtered off, re-slurried in water to wash and the molybdated zinc oxide pigments recovered dried at about 110° C. and broken up into a fine, pulverulent powder. Recovered insolubles are subjected to heating to above at least 100° C. and preferably above 300° C. Heating or calcining cause a change in the nature of the crystalline phase as well as other advantages.

It is preferred to heat the pigments in a furnace at least to about 300° C. but not to a level such that the individual particles of pigment begin to sinter together. (900° C. is higher than necessary.) Temperatures below about 900° C. are preferred. Good results have been obtained at calcination temperatures above about 300° but less than 800° C.

The criterion of heat treatment temperature is the development of the prominent identifying lines that can be observed upon X-ray diffraction analysis as will be seen in the plates made a part hereof. Heat treatment brings out the characteristic lines of a $2ZnO:1MoO_3$ compound, believed to be of outstanding value as a corrosion inhibiting pigment. Prominent lines are observed at 2.57 angstroms, 2.63 angstroms, 2.69 angstroms, 3.62 angstroms, 3.73 angstroms, 3.90 angstroms, and 4.20 angstroms which identify the 2:1 crystalline phase. Thus, the preferred calcination temperature range is the range where development of the strongest lines at these identifying peaks or lines occurs. The recovered products (as shown in later examples) physically resemble the original zinc oxide, being grit-free and having average particle diameters of the order of less than three microns and preferably less than one micron.

Utilizing the above described general technique for manufacture, a series of molybdated zinc oxide pigments were produced over a range of from 1:1 ratio of ZnO to $MoO_3$ to a 10:1 molar ratio, and after drying, subjected to further heat treatment which provides the advance in the art of this invention. The following examples are illustrative but not exhaustive or limiting of methods which may be used in preparing the novel pigment.

EXAMPLE 1

Pigmentary zinc oxide weighing 2,107 grams was slurried in 10 liters of water and heated to 70° C. In another container 371 grams of $MoO_3$ was slurried in about 10 liters of water and heated to 70° C. The two fluent slurries were mixed and stirred for one hour while being maintained at a temperature of 70° C. and one more hour while cooling. A cheese-like stage was passed through. The mixture was filtered, and the filtrate tested for molybdate; almost no molybdenum was present, the filtrate being substantially colorless. The filter cake was re-slurried, filtered again and dried at 110° C. and pulverized. The material was then heated in an electric furnace at 675° C. for one-half hour. Chemical analysis showed a ratio of $10ZnO:MoO_3$. The product closely resembled the original zinc oxide, being a finely divided grit-free powder, a comparatively free-flowing material. Microscopic examination showed its particle size to be below one micron on the average, about the same as the commercial zinc oxide pigment used as a reactant material. Yield was near 100 percent of theory.

EXAMPLE 2

Similar to Example 1, except that 1,949 grams of ZnO and 493.5 grams of $MoO_3$ were used. Total water was about twenty liters. Analysis of the product showed a ratio of $7ZnO:MoO_3$. Physical characteristics and yield were the same as in Example 1.

EXAMPLE 3

Similar to Example 1, except 1,753 grams of ZnO and 777 grams of $MoO_3$ were used. Product analysis showed a ratio of $4ZnO:MoO_3$. Physical characteristics were the same as Example 1.

EXAMPLE 4

Similar to Example 1, except 790 grams of ZnO and 465 grams of $MoO_3$ were used. Product analysis showed a ratio of $3ZnO:MoO_3$. Physical characteristics were the same as Example 1.

EXAMPLE 5

Similar to Example 1, except 658 grams of ZnO and 583 grams of $MoO_3$ were used. Product analysis showed a ratio of $2ZnO:MoO_3$. Physical characteristics were the same as Example 1.

EXAMPLE 6

Twenty-five grams of ZnO were slurried in 250 milliliters of water and heated to 80° C. in one vessel while 72.8 grams of a commercially available zinc molybdate (A. D. MacKay & Co.) were slurried in 500 milliliters of water and heated to 80° C. The two slurries were then mixed and stirred for two hours. The reaction product was filtered, dried at 110° C. The solids were calcined one hour at 600° C. Analysis of the product showed a ratio of $2ZnO:MoO_3$. Physical characteristics were similar to Example 1.

EXAMPLE 7

Procedure of Example 1. Quantities used were 68.9 grams ZnO and 81.1 grams $MoO_3$. The total reaction contained 2.2 liters of water. Calcination of reaction product was at 675° C. for one hour. The calcine analyzed $1.5ZnO:MoO_3$. Physical characteristics thereof were the same as Example 1. However, the filtrate contained perceptible amount of molybdenum (Blue color) showing unreacted excess.

EXAMPLE 8

Similar to Example 1, except that 448 grams of ZnO and 791 grams of $MoO_3$ were used. Analysis of this product showed a ratio of $1ZnO:MoO_3$. Recovered particles before calcination were coarser and displayed a marked tendency to cake. After calcination, physical characteristics were similar to the previous examples. However, the filtrate again contained a perceptible amount of molybdenum (strong blue color).

EXAMPLE 9

A twelve percent solids slurry of ZnO containing 300 grams ZnO was heated to 95° C. while agitating. The $MoO_3$ (130 grams) was added slowly over a period of 30 minutes. The slurry was held at 95° C. for two hours. The mixture was filtered, dried at 110° C. and calcined at 700° C. for one-half hour. Physical characteristics were comparable to Example 1.

Pigments produced in the foregoing examples were recovered, washed, dried, calcined, and formulated into a series of test paints. The test paint formulations were carefully balanced out, keeping in mind that the pigment volume concentration or PVC control is important to any reproducible paint test program. All test paints were formulated to a PVC of 90% of the critical pigment volume concentration (or CPVC) or so adjusted before further testing. The concept of Critical Pigment Volume Concentration is well known in the paint art and an article entitled "Oil Absorption and Critical Pigment Volume Concentration" by Asbeck, Laiderman and Van Loo, Official Digest, Federation of Paint and Varnish Production Clubs, March 1952; and "The Determination of Critical Pigment Volume Concentration by the Oil Absorption Test Method" by Steig, in the American Paint Journal, Sept. 22, 1958 is included herein by reference. Near this PVC metal primers show best combinations of rust and blister resistance.

As the Critical Pigment Volume Concentration or CPVC is the point where the non-volatile portion of the vehicle or liquid organic binder is just sufficient to wet all the pigment particles, one can see that below this pigment level the dry paint film is continuous and impervious. Above this level, the film begins to be permeable, allowing for vapor and liquid transmission through the pores of films formed therefrom.

Different pigments differ widely in their surface characteristics and hence absorb different amounts of the the total zinc content of the formula up to the same level as that in the formula which is given, namely four atoms of zinc for every atom of molybdenum. In addition, paints were prepared with molybdated zinc oxide at 10:1 (Example 1); 7:1 (Example 2) and 5.7:1 ratio of zinc to molybdenum contaaining the same amount of molybdenum trioxide as the previous paints, namely, one-half pound per gallon.

Paints were also prepared from uncalcined pigments and normal zinc molybdate both calcined and uncalcined, as well as a standard commercial rust inhibiting primers containing zinc chromate and red lead for comparisons.

The adjusted paints (for PVC) were sprayed on clean vapor degreased cold rolled steel panels and the panels were exposed to continuous spray with 5% salt solution. They were observed daily for the amount of rust developed and were rated on a scale where 10 is perfect and 0 is complete failure.

At the end of 19 days the panels were scribed diagonally to the metal with a 1½ inch mark. Rust creepage from these scribe marks was measured in 1/16 of an inch. Observed test results are reported in Table I.

TABLE I

| Days after start | 1 | 5 | 7 | 12 | 16 | 19 | 23 | 26 | 28 | 30 | 33 | 35 | 37 | 42 | 44 | Rust creepage 23 | 26 | 28 | 30 | 33 | 35 | 37 | 42 | 44 |
|---|---|---|---|---|---|---|---|---|---|---|---|---|---|---|---|---|---|---|---|---|---|---|---|---|
| Pigment: | | | | | | | | | | | | | | | | | | | | | | | | |
| 10:1 uncalcined | 9 | 8 | 8 | 7 | 7 | 7 | 7 | 7 | 7 | 6 | 6 | 6 | 6 | 6 | 6 | 0 | 1 | 2 | 3 | 3 | 3 | 4 | 5 | 5 |
| 10:1 calcined | 8 | 7 | 7 | 6 | 6 | 6 | 6 | 6 | 6 | 6 | 6 | 6 | 6 | 6 | 6 | 1 | 1 | 1 | 1 | 1 | 2 | 2 | 2 | 4 |
| 7:1 uncalcined | 9 | 8 | 8 | 7 | 6 | 6 | 6 | 6 | 6 | 6 | 5 | 5 | 5 | 5 | 5 | 1 | 2 | 2 | 3 | 3 | 4 | 5 | 7 | 7 |
| 7:1 calcined | 10 | 10 | 10 | 10 | 9 | 9 | 8 | 8 | 8 | 7 | 7 | 7 | 7 | 7 | 7 | 1 | 1 | 1 | 2 | 2 | 2 | 2 | 3 | 3 |
| 5.7:1 uncalcined | 10 | 10 | 9 | 8 | 8 | 7 | 7 | 7 | 6 | 6 | 5 | 5 | 4 | 4 | 3 | 1 | 1 | 1 | 5 | 7 | 12 | 20 | 28 | (*) |
| 5.7:1 calcined | 9 | 9 | 9 | 8 | 8 | 8 | 8 | 8 | 8 | 8 | 8 | 8 | 8 | 8 | 8 | 0 | 0 | 1 | 2 | 2 | 2 | 3 | 4 | 4 |
| 4:1 uncalcined | 10 | 9 | 9 | 8 | 8 | 7 | 7 | 7 | 7 | 6 | 6 | 6 | 5 | 5 | 5 | 1 | 2 | 5 | 5 | 6 | 9 | 10 | 13 | 13 |
| 4:1 calcined | 7 | 7 | 7 | 7 | 7 | 7 | 7 | 7 | 7 | 6 | 6 | 6 | 6 | 6 | 6 | 1 | 2 | 2 | 5 | 6 | 6 | 7 | 18 | 18 |
| 3:1 uncalcined | 10 | 10 | 9 | 8 | 7 | 7 | 7 | 5 | 4 | 2 | 1 | 1 | 1 | 1 | 1 | 1 | 2 | 24 | 36 | (*) | | | | |
| 3:1 calcined | 10 | 10 | 10 | 9 | 9 | 9 | 9 | 9 | 9 | 8 | 8 | 8 | 7 | 7 | 7 | 1 | 1 | 2 | 3 | 3 | 4 | 5 | 6 | 7 |
| 2:1 uncalcined | 8 | 8 | 8 | 7 | 5 | 5 | 5 | 5 | 5 | 5 | 4 | 4 | 4 | 4 | 3 | 2 | 3 | 3 | 3 | 3 | 4 | 13 | | |
| 2:1 calcined | 10 | 10 | 9 | 7 | 6 | 6 | 6 | 6 | 6 | 6 | 6 | 6 | 6 | 6 | 6 | 0 | 1 | 1 | 2 | 2 | 3 | 4 | 5 | 5 |
| 1:1 uncalcined | 9 | 7 | 7 | 6 | 5 | 5 | 5 | 5 | 5 | 5 | 4 | 4 | 4 | 4 | 3 | 0 | 1 | 1 | 2 | 8 | 8 | 14 | (*) | |
| 1:1 calcined | 10 | 10 | 10 | 9 | 9 | 9 | 8 | 8 | 8 | 8 | 8 | 8 | 8 | 8 | 8 | 1 | 1 | 1 | 2 | 2 | 2 | 3 | 3 | 3 |
| 1:1 double decomposition uncalcined | 7 | 7 | 7 | 6 | 5 | 5 | 5 | 5 | 5 | 5 | 4 | 4 | 4 | 4 | 4 | 1 | 2 | 2 | 2 | 3 | 5 | 6 | (*) | |
| 1:1 double decomposition calcined | 7 | 6 | 6 | 6 | 6 | 6 | 6 | 6 | 6 | 6 | 6 | 6 | 6 | 6 | 6 | 1 | 2 | 2 | 2 | 6 | 6 | 6 | 6 | 6 |
| Zinc chromate red lead primer | 8 | 7 | 7 | 7 | 7 | 6 | 6 | 5 | 5 | 5 | 5 | 5 | 5 | 5 | 5 | 1 | 1 | 2 | 1 | 1 | 1 | 1 | 1 | 1 |

*Creepage not measured.

point vehicle. Thus changes in the pigment quality at the same weight levels may result in a paint with a different Critical Pigment Volume Concentration or CPVC. Thus, in evaluating the corrosion inhibition qualities of a pigment, erroneous conclusions may be reached if the paints are not formulated at comparable permeabilities. Considerable efforts to eliminate this common error were expended in evaluation of the corrosion inhibiting pigments compared in the series of tests here described.

EXAMPLE 10

Molybdate zinc oxide with a 4:1 ratio mole according to Example 3 above was formulated into a rust inhibiting paint. The formula used was as follows:

| Material | Pounds | Gallons |
|---|---|---|
| 4ZnO:1MoO$_3$, calcined | 163 | 4.45 |
| Magnesium silicate | 344 | 14.83 |
| Titanium dioxide, anatase | 125 | 3.86 |
| An organic treated bentonite clay (Bentone 34) | 4 | 0.30 |
| Soya lecithin | 4 | 0.50 |
| Raw linseed oil | 85 | 11.00 |
| Bodied linseed oil (Z$_2$-Z$_3$ Gardner-Holdt body) | 176 | 22.00 |
| Oil mod. phenolic vehicle, 60% N.V.M. | 66 | 8.83 |
| 24% lead drier | 9 | 1.00 |
| 06¢ manganese drier | 7 | 1.00 |
| Methyl ethyl ketoxime (17% soln.) | 7 | 1.00 |
| | 216 | 33.23 |
| Total | 1,206 | 120.00 |

NOTE.—Total wt./gal. 11.82; P.V.C. 38.0%.

Other paints were made using the same formula except that molybdated zinc oxides of lower ratios were used, namely 3:1, 2:1, and 1:1. These pigments were made according to the procedures of Examples 4, 5 and 8. In each case, the amount of molybdenum was held constant at one-half pound MoO$_3$ per gallon. In all of the low ratio molybdated zinc oxides, an additional amount of straight untreated zinc oxide was added to the formula so as to bring A study of Table I reveals in general the calcined molybdated zinc oxides were improved in performance over noncalcined molybdated zinc oxides under the comparable test conditions. The calcined pigments were also found superior to the standard commercial rust inhibitive paint made on a similar paint formula but utilizing zinc chromate and red lead as the inhibiting pigment when exposed to similar test procedures.

Having established in practical test the superiority of the novel calcined molybdated zinc oxides, interest was directed to establishing the nature of the advance in the pigmentary art thus achieved.

X-ray diffraction studies were made and the following X-ray diffraction pattern plates provide the essential data establishing the disclosed process produces novel compositions of matter at a zinc oxide to molybdenum trioxide at a ratio slightly above a 1:1 molar level (1.5:1).

Figure 5:
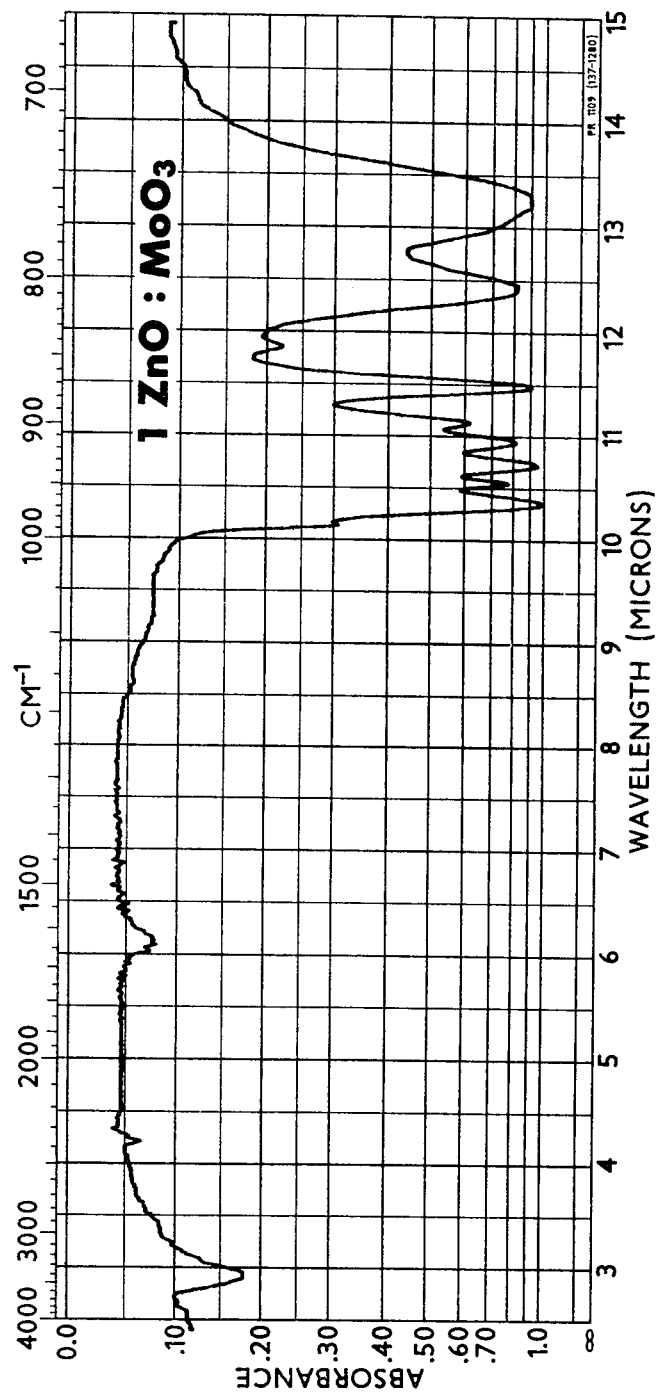

Additional figures include infra-red absorption spectrograms of corresponding products where:

FIG. 5 is the infra-red spectrogram of a product prepared according to Example 8 of the invention, at a mol ratio of 1ZnO:MoO₃.

Figure 6:
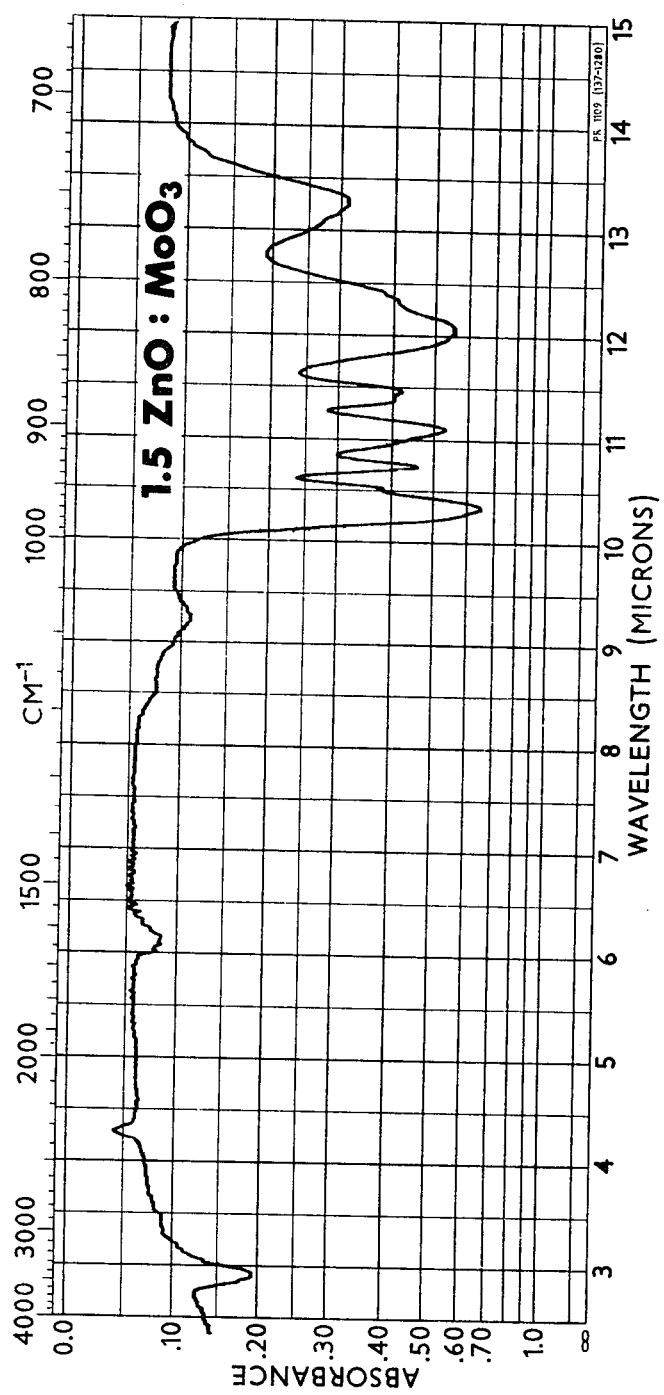

FIG. 6 is the infra-red spectrogram of a product prepared according to Example 7 of the invention, at a mol ratio of 1.5 ZnO:MoO₃.

Figure 7:
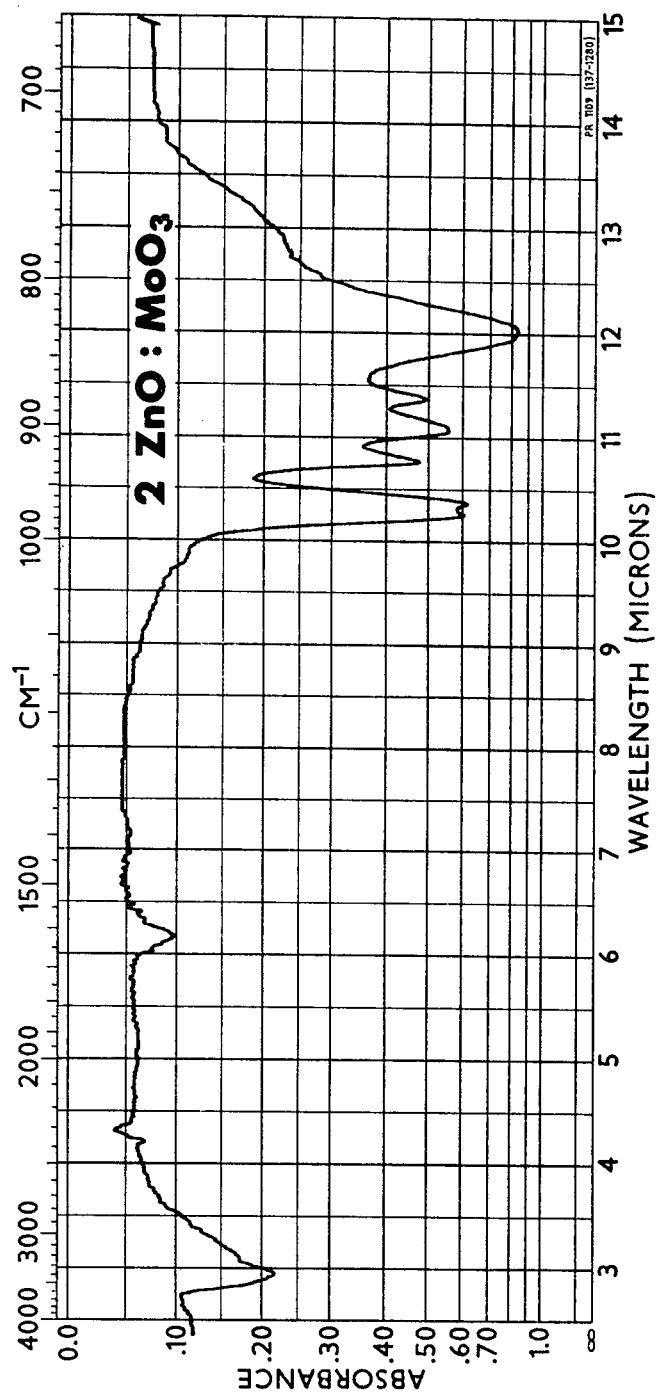

FIG. 7 is the infra-red spectrogram of a product prepared according to Example 5 of the invention, at a mol ratio of 2ZnO:MoO₃.

Figure 8:
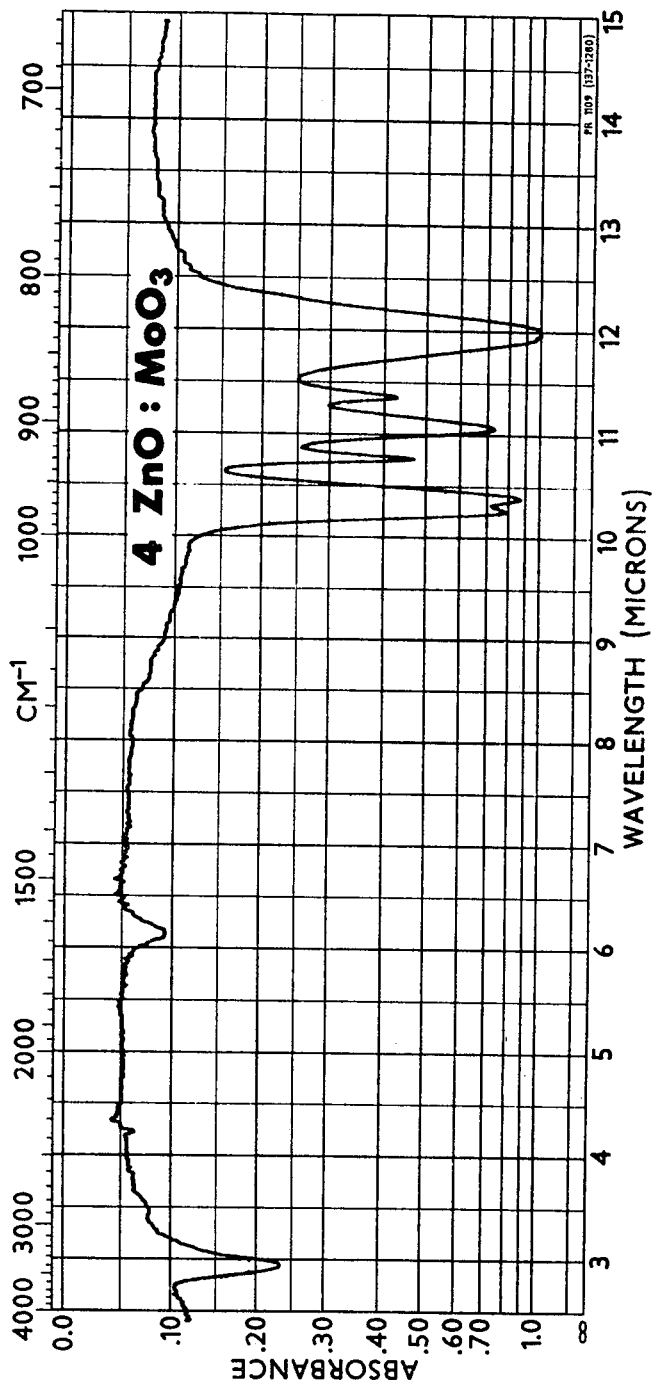

FIG. 8 is the infra-red spectrogram of a product prepared according to Example 3 of the invention, at a mol ratio of 4ZnO:MoO₃.

Diffraction patterns of the above as shown in the identified plates were obtained through use of a Norelco X-ray diffraction unit using a high intensity copper X-ray tube requiring 40 milliamperes at 40 kilowatts. The goniometer scan rate was at one degree per minute with a chart speed of 0.5 inch/minute. The range of scan was from 55° to 5° corresponding to two theta. A solid state scintillator detector was employed using a nickel filter or the detector. Analyzer conditions as to pulse height were as follows: Base line 3.6 volts, window 18.0 volts, 975 volts applied to the detector and amplifier gain was zero, sample holder on 800 counts per second at full scale range. Scale factor 1 x 16. While equivalent diffraction patterns could be obtained, possibly, with slightly varying conditions, the above set out those used in these X-ray diffraction studies represented in the drawings.

Figure 1:
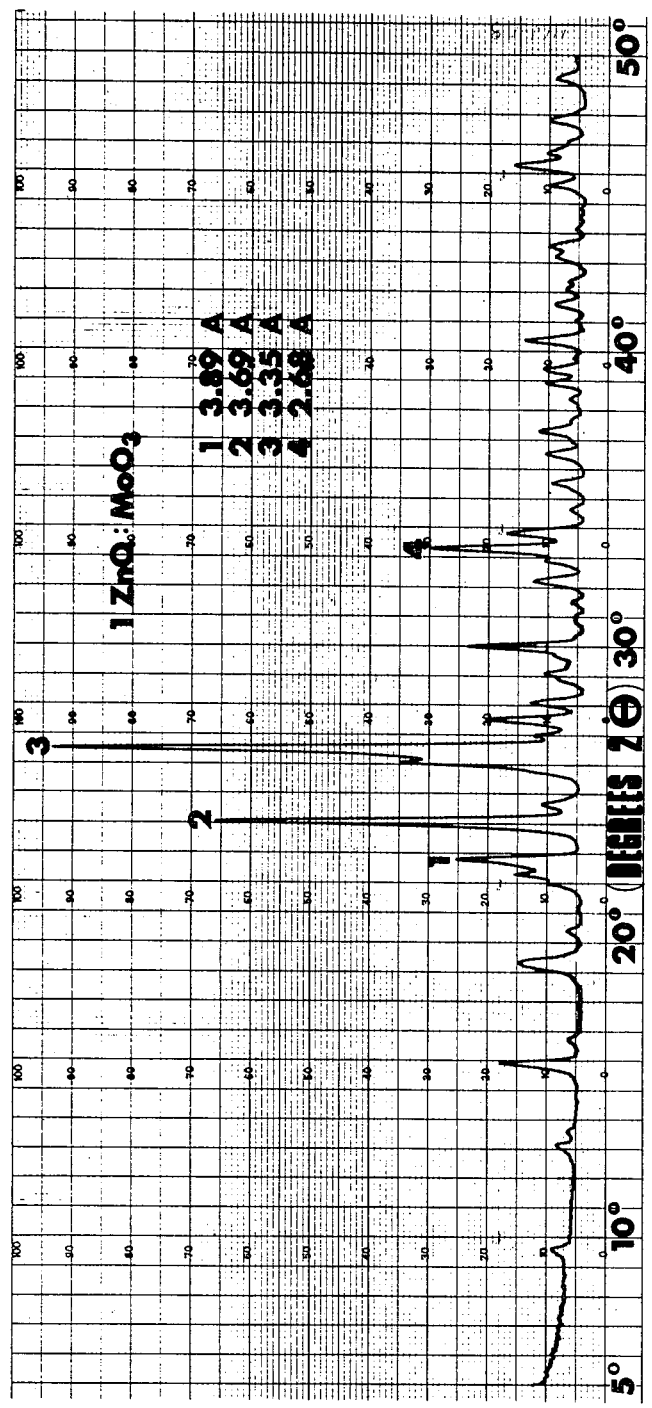
FIG. 1 is an X-ray diffraction pattern of the aqueous reaction product of one mol of zinc oxide with one mol of molybdenum trioxide produced in accordance with the disclosed process (Example 8).

Referring more specifically to the X-ray diffraction spectrum included herein as FIGS. 1 through 4 and initially to FIG. 1, it will be observed that FIG. 1 which is an X-ray diffraction pattern of a mole for mole wet reaction material calcined, shows a multiplicity of peaks or lines indicating at least one crystalline phase and possibly more, and the infra-red spectrum FIG. 5 shows a multiplicity of new absorption bands indicating the formation of chemical bonds. However, there is little or no indication of formation of a new basic zinc molybdate, as has been disclosed and claimed herein.

Figure 2:
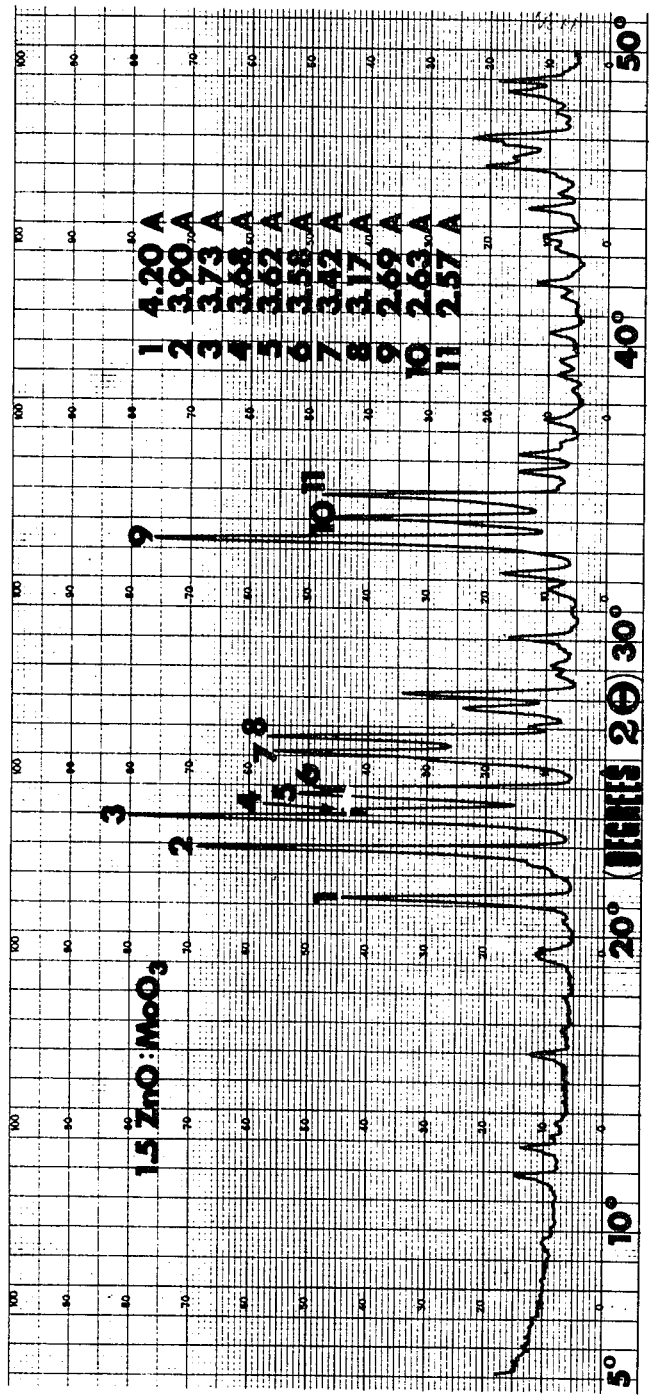
FIG. 2 is an X-ray diffraction pattern of the aqueous reaction product of one and one-half mol of zinc oxide with one mol of molybdenum trioxide produced and calcined (Example 7) in the manner herein described and claimed.

FIG. 2 X-ray spectrum details evidence of a new composition of matter being formed of a crystalline nature different than FIG. 1. Peaks or lines at 2.57 angstroms, 2.63 angstroms, 2.69 angstroms, 3.73 angstroms, 3.90 angstroms and 4.20 angstroms are now apparent. We are advised that the X-ray diffraction pattern of FIG. 2, particularly when interpreted in accordance with the accompanying FIGS. 1 through 4 establish existence of a novel crystal structure of 2ZnO·MoO₃ or Zn₂MoO₅ which is present in all calcined pigments within the ranges here contemplated of ZnO:MoO₃.

Emission analysis has established the presence of no metallic compounds other than zinc and molybdenum. The infra-red absorption spectra discloses existence of a specific compound very near to 2ZnO·MoO₃ (note ZnO not absorbed in this region of the spectra). Thus, the absorption bands or peaks in FIGS. 5 through 8 appear to verify the data shown in the X-ray diffraction patterns of FIGS. 1 through 4.

Experts verify that the major peaks at 4.20, 3.73, 3.62, 3.44, 3.17, 2.63 and 2.58 do not appear in the A.S.T.M. Powder Diffraction Data file and (except for minor differences between instruments and operators) that these predominant peaks or lines identify a new composition of matter, particularly as in FIGS. 3 and 7.

Figure 3:
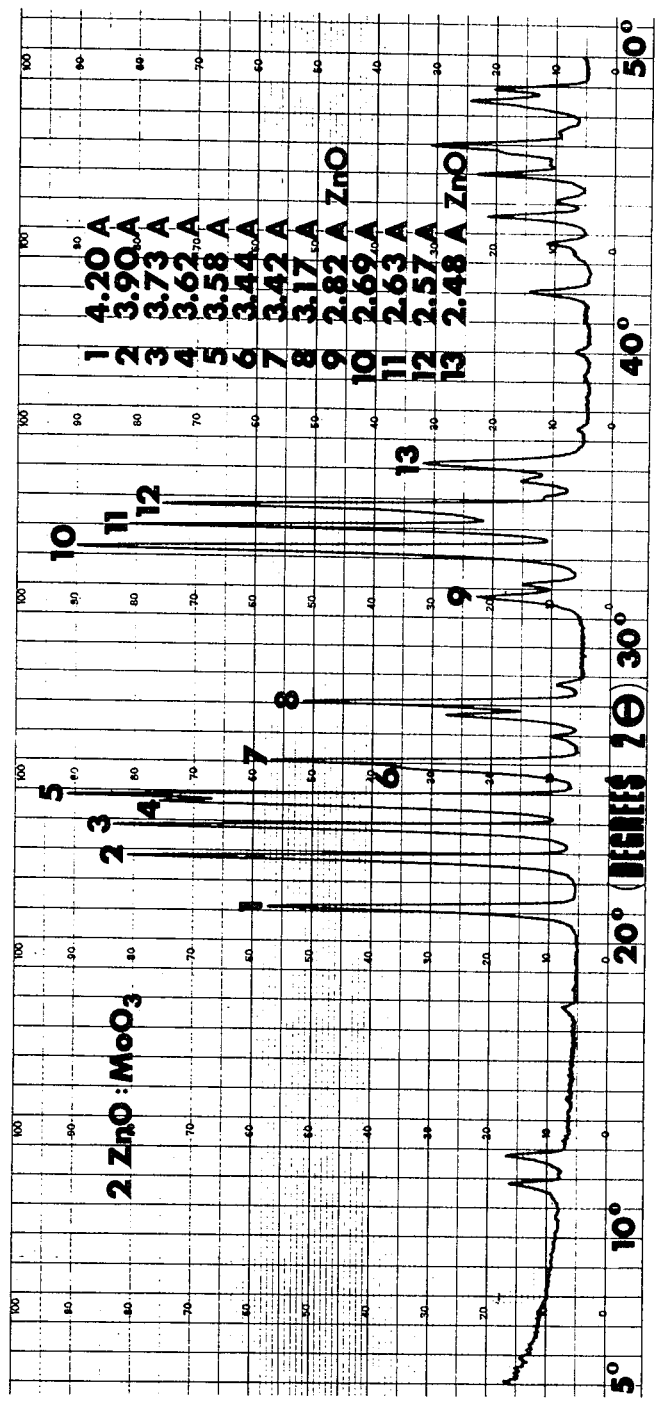
FIG. 3 is an X-ray diffraction pattern of the aqueous reaction product of two mol of zinc oxide with one mol of molybdenum trioxide as in Example 5 (otherwise as in FIGS. 1 and 2).

FIG. 3 X-ray spectrum discloses more evidence of new composition of matter being formed. The peaks listed in FIG. 2 are much more pronounced with only a small amount of zinc oxide present.

Figure 4:
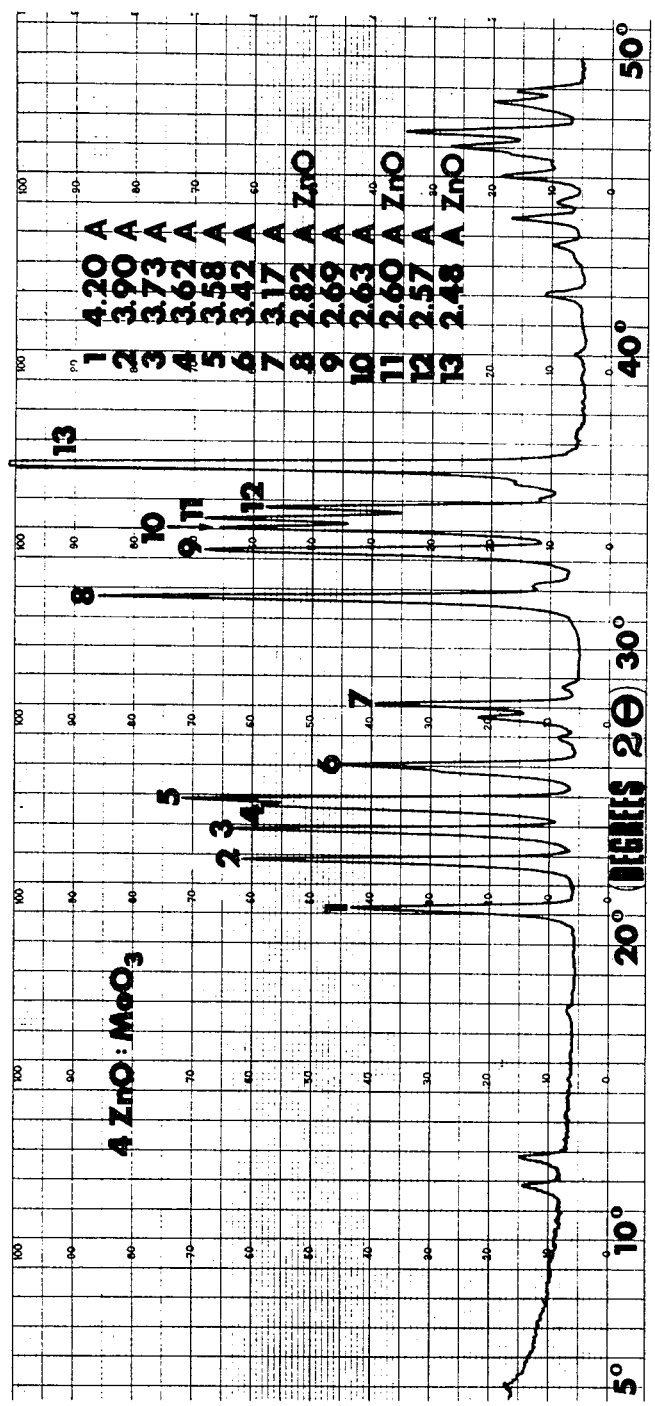
FIG. 4 is an X-ray diffraction pattern of the aqueous reaction product of four mols of zinc oxide and one mol of molybdenum trioxide produced in accord with Example 3 and is comparable process to the above figures.

FIG. 4 X-ray spectrum shows these same peaks but also shows an increase in zinc oxide content, indicating free zinc oxide in the composition. Thus studies here referred to identify an unreported zinc molybdate structure. The novel crystal forms upon calcination at a level of ZnO to MoO₃ above a 1:1 mole ratio of ZnO to MoO₃ becomes identifiable. Analytical studies indicate basic forms of molybdated zinc oxide exist contrary to expectations; the enhanced corrosion resistance of the paints containing the pigments produced by the method herein described are due to new molybdated zinc oxide crystal forms of the 2:1 ratio type where zinc oxide is always present in excess over theory, and the novel crystalline phases come into existence upon calcination.

X-ray diffraction studies further indicate that the series of calcined pigments produced ranging from the 2:1 ratio of ZnO to MoO₃ to 10:1 ratio or higher by the method described produce novel 2:1 ratio chemical compounds in combination with free zinc oxide at the higher mol ratios of ZnO:MoO₃ than the 2:1 level.

The proof of a new and previously unreported chemical compound has been demonstrated as discussed herein. Infra-red absorption spectra for each sample was obtained by carefully mixing 0.1 milligram of the sample with 0.2 gram of potassium bromide and pelletizing the mixture in a hydraulic press at a total pressure of 12.5 tons. The pellet was placed in a Perkin-Elmer Model 21 infra-red spectrograph and the tracing obtained.

FIG. 7 and FIG. 8 show absorption peaks at 10.3, 10.4, 10.8, 11.1 and 12.1 microns.

These absorption peaks are present in FIG. 6 along with other peaks.

These are absent in FIG. 5.

The following comparisons between the calcined vs. uncalcined material from U.S. Pat. 3,353,979 are of interest.

TABLE II.—X-RAY DIFFRACTION PEAKS

| Zinc molybdate 2:1 ratio calcined | Zinc molybdate 4:1 ratio calcined | Zinc molybdate 2:1 ratio uncalcined | Zinc molybdate 4:1 ratio uncalcined |
|---|---|---|---|
| 2.57 | 2.57 | 1.51 | 1.51 |
| 2.63 | 2.63 | 1.58 | 1.58 |
| 2.69 | 2.69 | 1.65 | 1.65 |
| 3.17 | 3.17 | 2.18 | 2.18 |
| 3.42 | 3.42 | 2.29 | 2.21 |
| 3.44 | 3.44 | 2.69 | 2.69 |
| 3.58 | 3.58 | 4.83 | 4.87 |
| 3.62 | 3.62 | 9.7 | 9.7 |
| 3.73 | 3.73 | | |
| 3.90 | 3.90 | | |
| 4.20 | 4.20 | | |

From Table II above it is quite clear that heat treatment developed novel crystalline phases not originally observed in non-calcined materials of similar ratios. Additionally comparative accelerated corrosion exposure tests demonstrated superiority of the heat treated or calcined product over its non-calcined counterpart.

Having described and illustrated the best mode of practice of our invention known to us, what we claim is:

1. In a method of preparation of a novel form of molybdated zinc oxide which comprises heating together in an aqueous environment in excess of one mol but less than 10 mols of zinc oxide for each mol of molybdenum trioxide to react the same together and recovering salt-free water insoluble molybdated zinc oxide reaction products, said reaction products characterized by ascertainable X-ray absorption peaks, the improvement which comprises calcining at a temperature greater than 300° C. but below the sintering temperature thereof to change the crystalline structure thereof to show different X-ray absorption peaks and to dehydrate the reaction products.

2. $Zn_2MoO_5$ having X-ray absorption peaks at 2.57, 2.63, 2.69, 3.62, 3.73, 3.90, and 4.20 angstroms.

3. A new composition of matter having the general structure $xZnO \cdot yMoO_3$ where $x$ is greater than $y$ and the compound is characterized by an X-ray diffraction pattern with predominate peaks at 4.2, 3.9, 3.73, 2.63 and 2.57 angstrom units.

4. A new composition of matter having the general structure $xZnO \cdot yMoO_3$ where $x$ is greater than $y$ and is characterized by an X-ray diffraction pattern substantially as shown in FIG. 3.

5. In a process for producing a novel basic zinc molybdate wherein the stoichiometric ratio of zinc oxide to molybdenum trioxide therein is greater than 1:1 but less than about 10:1 by reacting the essential oxides above in aqueous slurry and recovering solid molybdated zinc oxide reaction product having ascertainable X-ray absorption peaks, the improvement which comprises heating the recovered solid reaction product above 300° C., but not above the sintering temperature thereof to change the crystalline structure thereof to show different X-ray absorption peaks and to dehydrate the reaction product.

6. In a method of manufacture of a corrosion inhibiting basic molybdated zinc oxide pigment which comprises intimately admixing in fluent aqueous slurry in excess of one mol to not more than about 10 mols of commercial pigmentary zinc oxide (A) and an amount of molybdic acid (B) sufficient to provide a ratio of (A) to (B) in excess of 1:1 but not more than 10:1, intimately admixing said reactants in aqueous slurry until the filtrate therefrom is substantially free of molybdate ion and recovering the molybdated zinc oxide precipitate which precipitate has ascertainable X-ray absorption peaks, the improvement which comprises calcining the precipitate at a temperature in excess of 600° C. but below the sintering temperature thereof to change the crystalline structure of the precipitate to show different X-ray absorption peaks and to dehydrate the product.

7. A corrosion inhibiting metal protective paint in which the pigmentary portion of the paint system contains a calcined molybdated zinc oxide pigment in which the mol ratio of zinc oxide to molybdenum trioxide is in excess of 1:1 but not in excess of 10:1, said pigment having prominent identifying X-ray diffraction lines at about 2.63, 2.57, 3.73, 3.90 and 4.20 angstroms, said pigment essentially free from water soluble contaminant salts.

References Cited

UNITED STATES PATENTS 3,353,979    11/1967    Hunn _____ 106—296

OTHER REFERENCES

Chem. Abstracts, vol. 56, June 1962 14,425 (Sci. Lib. Q.D.1A51).

JAMES E. POER, Primary Examiner

U.S. Cl. X.R.

23—55